United States Patent
Groenenboom

(10) Patent No.: US 6,304,245 B1
(45) Date of Patent: Oct. 16, 2001

(54) METHOD FOR MIXING PICTURES

(75) Inventor: Johannes C. Groenenboom, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/159,991

(22) Filed: Sep. 24, 1998

(30) Foreign Application Priority Data

Sep. 30, 1997 (EP) .................................................. 97203009

(51) Int. Cl.[7] .............................. G09G 5/36; G09G 5/00; H04N 11/00
(52) U.S. Cl. ........................ 345/136; 345/114; 348/552
(58) Field of Search .................................... 345/114, 435, 345/113, 428, 136; 348/552

(56) References Cited

U.S. PATENT DOCUMENTS

| | | | | |
|---|---|---|---|---|
| 4,135,212 | * | 1/1979 | Pugsley et al. | 358/462 |
| 5,179,639 | * | 1/1993 | Taaffe | 345/433 |
| 5,239,625 | * | 8/1993 | Bogart et al. | 345/136 |
| 5,473,737 | * | 12/1995 | Harper | 345/114 |
| 5,488,674 | * | 1/1996 | Burt et al. | 345/435 |
| 5,488,687 | * | 1/1996 | Rich | 345/435 |
| 5,513,300 | * | 4/1996 | Shibazaki | 345/435 |
| 5,568,269 | * | 10/1996 | Jamzadeh | 358/298 |
| 5,621,428 | | 4/1997 | King et al. | 345/118 |
| 5,638,501 | * | 6/1997 | Gough et al. | 345/435 |
| 5,781,666 | * | 7/1998 | Ishizawa et al. | 382/284 |
| 5,999,191 | * | 12/1999 | Frank et al. | 345/435 |
| 6,128,021 | * | 10/2000 | ven der Meulen et al. | 345/428 |

* cited by examiner

*Primary Examiner*—Jeffery Brier
*Assistant Examiner*—Ryan Yang
(74) *Attorney, Agent, or Firm*—Edward W. Goodman

(57) ABSTRACT

A method for mixing a foreground picture and a background picture having different resolutions. Parts of the foreground picture of which the color complies with a color-key are designated as being transparent. Artifacts which are caused by scaling of a foreground picture which contains transparent parts by conventional means are avoided by mixing the foreground picture and the background picture at an intermediate resolution, which is substantially equal to the least common multiple of the resolution of the foreground picture and the resolution of the background picture. Alternatively, instead of actually scaling the pictures to the intermediate resolution, a phase table can be used, the entries of which prescribe how a background pixel should be combined with a predetermined number of foreground pixels.

10 Claims, 6 Drawing Sheets

METHOD FOR MIXING PICTURES

BACKGROUND OF THE INVENTION

1. Field of the Invention

The present invention relates to a method for mixing a foreground picture and a background picture, a resolution of the foreground picture differing from a corresponding resolution of the background picture, the method comprising designating parts of the foreground picture as being transparent, and replacing transparent parts of the foreground picture by underlying parts of the background picture, the foreground picture and the background picture being converted to a common target resolution.

2. Description of the Related Art

Such a method is widely used in display systems which are suited for presenting a mixture of graphics and video signals on a display screen. An example of such a system is disclosed in U.S. Pat. No. 5,621,428. Normally, one of the signals is designated as a foreground signal, which causes a picture corresponding to the foreground signal to hide other pictures corresponding to the other signals at locations where the pictures mutually overlap. Parts of the foreground picture, of which the color complies with a predetermined color key, appear as transparent parts on the display screen, thus showing underlying parts of other pictures. In general, the respective spatial resolutions of the graphics and video signals are mutually different, either horizontally, vertically or in both directions. In those cases, the signals have to be scaled to a common resolution.

A disadvantage of known methods for mixing signals of different spatial resolutions using color keying, is that the scaling causes the color key to blend with colors of neighboring parts of the foreground image, yielding visible artifacts at the edges of transparent parts of the foreground image.

An objective of the present invention is to provide a method for mixing signals of different spatial resolutions using color keying in which said artifacts are avoided. To that end, the method according to the invention is characterized in that the replacement of transparent parts of the foreground picture by underlying parts of the background picture is effectively accomplished at an intermediate resolution, which is different from the target resolution, and which substantially equals the least common multiple of the resolution of the foreground picture and the corresponding resolution of the background picture.

By mixing the foreground picture and the background picture at the intermediate resolution, no averaging of pixels needs to take place, so there is no blending of the color key with colors of neighboring parts.

A method according to the invention actually scales the foreground picture and the background picture to the intermediate resolution by replicating pixels, respectively, by the denominator and the numerator of a fraction which represents or approximates the proportion between the resolution of the foreground picture and the resolution of the background picture. By replicating the pixels by a whole number, no blending of the color key takes place. At the intermediate resolution, pixels of the foreground picture and the background picture can be processed two by two. If a foreground pixel is opaque, the corresponding background pixel is ignored. If a foreground pixel is transparent, it is replaced by the corresponding background pixel. After mixing both pictures, the result picture is scaled to the target resolution.

The invention also relates to a display apparatus, embodying the above method according to the invention.

A further method according to the invention predicts the effect of actually mixing the pictures at the intermediate resolution by constructing a table of coefficients in advance. Instead of actually scaling the foreground picture and the background picture to the intermediate resolution, pixels from the background picture are combined one at a time with a number of pixels from the foreground picture in a way which is prescribed by the coefficients contained in a table entry. Each time an output pixel has been produced, a next table entry is selected as the source of the coefficients. Initially the first entry is selected, and after the last entry, the process proceeds cyclically by selecting the first entry again.

The invention also relates to a display apparatus, embodying this last-mentioned method according to an embodiment of the invention.

BRIEF DESCRIPTION OF THE DRAWINGS

FIG. 3 shows pixels of the two pictures being scaled to an intermediate resolution;

FIG. 4 shows a mixture of the two pictures at the intermediate resolution;

DESCRIPTION OF THE PREFERRED EMBODIMENTS

Figure 1:
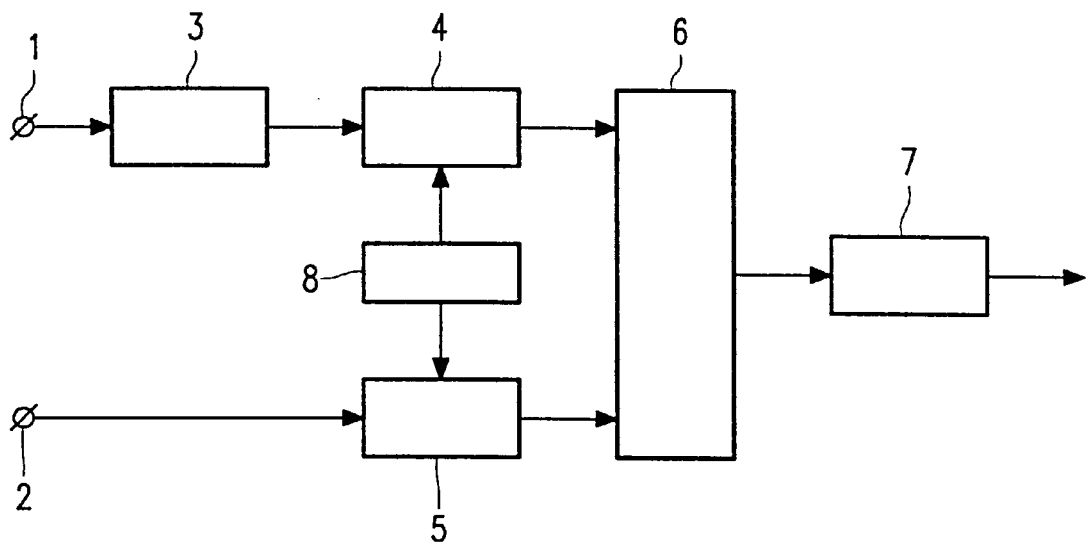
FIG. 1 shows a diagram of a display apparatus according to an embodiment of the invention.

FIG. 1 shows a display apparatus according to an embodiment of the invention. It could be a part of, for example, a multimedia computer system or a TV/DVD system. Input 1 is suited for receiving a graphics signal as a foreground signal, while input 2 is suited for receiving a video signal as a background signal. Color-keying means 3 designate a predetermined color, the color key, in the foreground signal as being transparent. Parts of a foreground picture of which the color complies with the color key will be replaced by parts of an underlying background picture. Multiple colors could be designated as color keys in this way.

All following references to a resolution should be apprehended as referring to the horizontal resolution. However, the invention could also be applied to pictures of which the vertical resolutions are mutually different, or combinations of both cases. Additional measures could be required to compensate for the fact that the scaling direction is different from the scanning direction.

Storage means 8 comprises storage registers for storing the numerator and the denominator of a fraction which equals or approximates the proportion between the horizontal resolution of the foreground picture and the horizontal resolution of the background picture. Scaling means 4 is suited for scaling the graphics picture to an intermediate resolution by replicating pixels by a number equalling the denominator of the fraction. Scaling means 5 is suited for scaling the video picture to an intermediate resolution by replicating pixels by a number equalling the numerator of the fraction.

Mixing means 6 is suited for mixing the foreground picture and the background picture, by replacing colorkeyed parts of the foreground picture by underlying parts of the background picture. The result picture is delivered to scaling means 7 which converts the result picture to a target resolution. The scaling means 4, 5 and 7, and the mixing means 6 are implemented by dedicated hardware circuits which are obvious to someone skilled in the art. Alternatively, they could be implemented in software, executed by a microprocessor. It is to be noted that the function of the color-keying means 3 could be restricted to simply recognizing one or more colors as color keys. Therefore, it could be a part of the mixing means 6, which must also recognize the color key in order to be able to mix the foreground picture and the background picture.

The storage means 8 can contain further fractions for other combinations of graphics and video signals with various resolutions. In general, only a small set of fractions will suffice. Table 1 shows fractions for a number of current graphics resolutions and a horizontal video resolution of 720 pixels.

TABLE 1

| Graphics resolution | Numerator | Denominator |
|---|---|---|
| 1024 × 576 | 19 | 27 |
| 768 × 576 | 15 | 16 |
| 848 × 480 | 17 | 20 |
| 640 × 480 | 9 | 8 |

Figure 2:
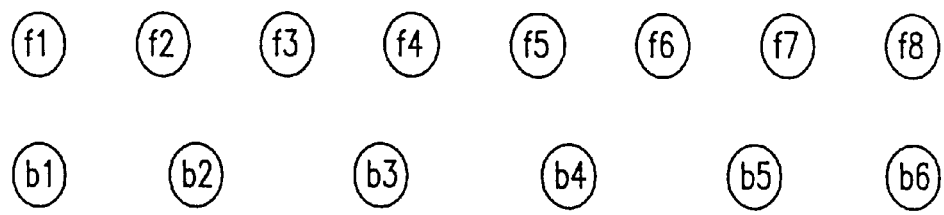
FIG. 2 shows pixels of two pictures having different resolutions.

FIG. 2 shows pixels f1 to f8 from a foreground graphics picture with a horizontal resolution of 1008 pixels and pixels b1 to b6 from a background video picture with a horizontal resolution of 720 pixels. The proportion between the resolution of the foreground picture and the resolution of the background picture is $7/5$.

Figure 3:
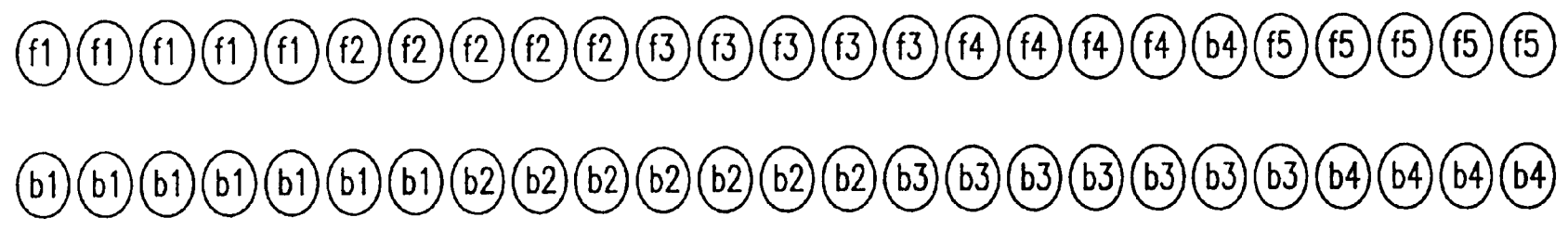

FIG. 3 shows pixels of the same pictures after they have been scaled to an intermediate resolution by replicating the foreground pixels by five and by replicating the background pixels by seven. At this resolution, or multiples of it, there is for each foreground pixel, a corresponding background pixel. Mixing the two pictures is easily achieved by processing corresponding pixels two-by-two, each pair producing one output pixel. A transparent foreground pixel is replaced by its corresponding background pixel, while an opaque foreground pixel completely hides its corresponding background pixel.

Figure 4:
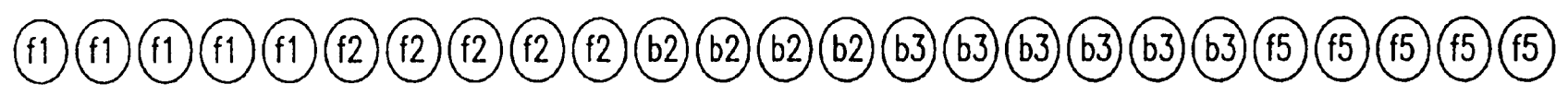

FIG. 4 shows the result pixels at the intermediate resolution if the foreground pixels f3 and f4 are transparent. By thus mixing the pictures at the intermediate resolution, color keys cannot blend with colors of neighboring pixels, because before mixing, only replication takes place, leaving the correspondence between a pixel and its color intact. After mixing, the output picture is converted to the target resolution by conventional means. In the present embodiment, the target resolution equals the resolution of the background picture. The conversion is achieved by grouping and averaging seven pixels at a time. Averaging pixel colors cannot produce artifacts anymore, because all color keys have already been processed.

Figure 5:
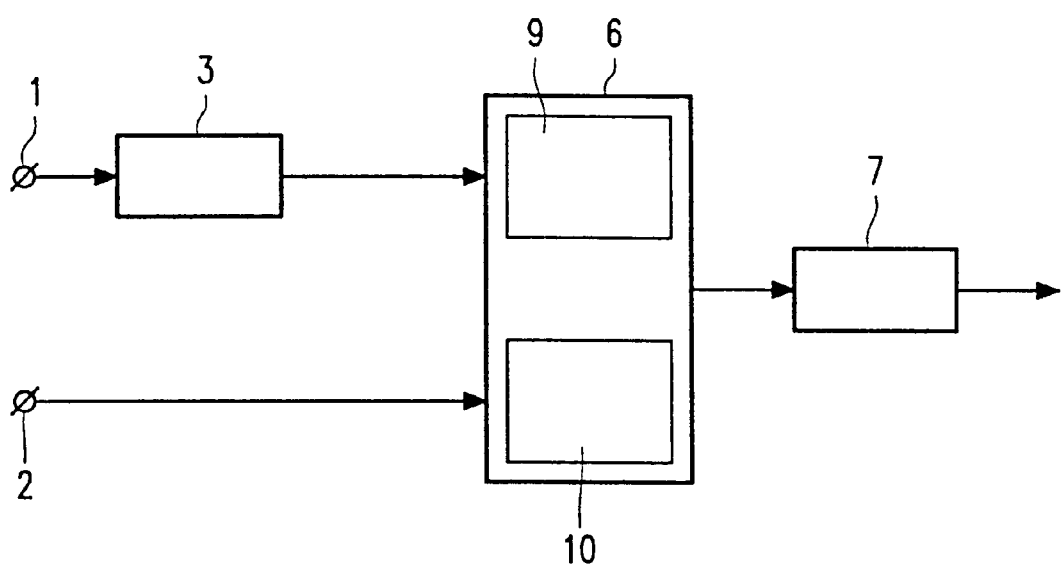
FIG. 5 shows a diagram of a display apparatus according to a further embodiment of the invention.

FIG. 5 shows a display apparatus according to a preferred embodiment of the invention. The inputs 1 and 2, the color keying means 3 and the scaling means 7 fulfill the same functions as they did in the previous embodiment. The mixing means 6 further comprises storage means 9 and computing means 10. The storage means 9 comprises a read-only or random-access memory for storing a table of coefficients which are utilized by the computing means 10 to mix the foreground picture and the background picture without actually scaling them to the intermediate resolution. In effect, the present embodiment yields the same results as the previous embodiment, but it achieves this with simpler means, e.g., there is no need for high speed scaling means.

Instead of the pictures being actually scaled and mixed, these steps are compiled into the coefficients.

The output picture has the same resolution as the background picture, which, if that resolution equals the target resolution, also evades the need for the scaling means 7.

The coefficients can be pre-computed and stored in a read-only memory during manufacturing, or they can be computed during initialization or when a new pair of resolutions is required. The coefficients comprise weight factors which predict the contribution of a predetermined number of input pixels from the foreground picture to a pixel of the output picture. The coefficients also comprise a skip factor, which determines how many input pixels from the foreground picture have been processed completely, and hence, will not contribute to a next output pixel.

Various methods can be applied to compute the coefficients. An example will be described later.

Table 2 shows coefficients for mixing a foreground picture with a horizontal resolution of 1008 pixels, and a background picture with a resolution of 720 pixels, yielding a fraction of $7/5$.

TABLE 2

| weight 1 | weight 2 | weight 3 | skip |
|---|---|---|---|
| 5 | 2 | 0 | 1 |
| 3 | 4 | 0 | 1 |
| 1 | 5 | 1 | 2 |
| 4 | 3 | 0 | 1 |
| 2 | 5 | 0 | 2 |

Each row of Table 2 provides the necessary information for producing an output pixel of a mixed picture, based on input pixels from the foreground picture and the background picture at different resolutions. The first output pixel is computed by means of the first row, the second pixel by means of the second row, etc. The process proceeds cyclically, hence the sixth output pixel is again computed by means of the first row. The number of table entries is equal to the denominator of the fraction.

The coefficient in the first, the second and the third column of Table 2 are weight factors defining the relative contribution to an output pixel of respectively a first, a second and a third input pixel from the foreground picture. For example, if the first three input pixels f1, f2 and f3 from the foreground picture are opaque, the first output pixel o1 is produced by averaging the input pixels proportionally to the weight factors in the first row of Table 2:

$$o1=(5f1+2f2+0f3)/7$$

The scale factor '7' could be stored in a further storage means (not shown), or alternatively, all coefficients of Table 2 could be normalized by dividing them by seven. If the second foreground pixel would be transparent, its contribution would be ignored and replaced by an equivalent contribution of the first input pixel b1 from the background picture, yielding the following output pixel:

$$o1=(5f1+2b1+0f3)/7$$

If both the first and the second foreground pixel would be transparent, the output pixel would be a copy of the first background pixel.

The skip coefficients in the last column indicate how many input pixels should be skipped before proceeding with the next row. For example, after the first output pixel has been produced, no contribution from the first input pixel from the foreground picture is needed anymore, so it can be skipped. If all relevant input pixels from the foreground picture are opaque, the next three output pixels are computed as follows (the indices indicating a pixel's relative number):

$$o2=(3f2+4f3+0f4)/7$$

$$o3=(f3+5f4+f5)/7$$

$$o4=(4f5+3f6+0f7)/7$$

After the third output pixel has been produced, no contributions from the third and the fourth input pixel are needed anymore, so both pixels can be skipped.

Figure 6:
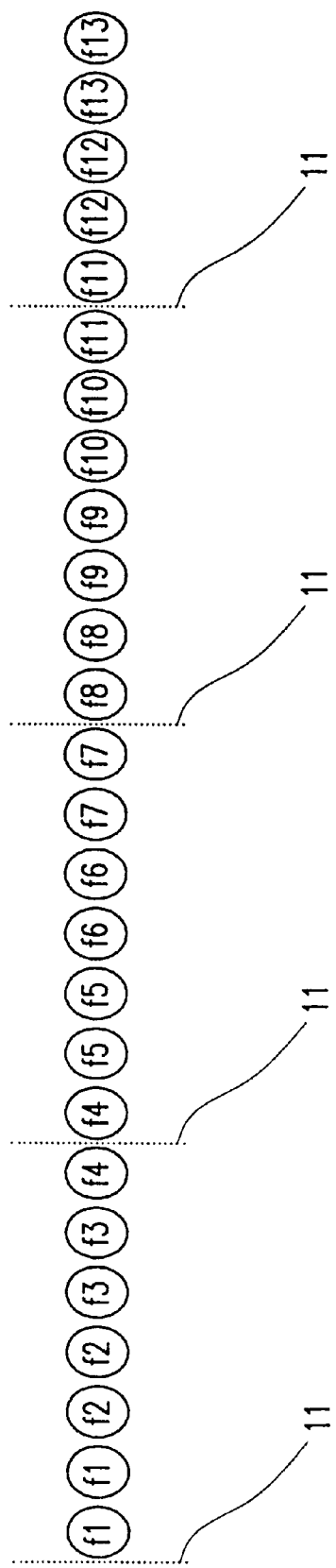
FIG. 6 shows pixels of a picture having a relatively high resolution.

For most current resolutions, three weight factors are needed. If the proportion between the foreground picture and the background picture is smaller than one, e.g., 5/6, two weight factors suffice. For large scale factors, however, a fourth or even a fifth weight factor might be needed. In all cases, it is sufficient to apply a number of weight factors which is given by the following formula:

Number of weight factors=ceiling(numerator/denominator)+1, where 'ceiling' yields its argument rounded upwards. When the numerator modulus the denominator equals zero or one, even one weight factor less suffices. For example, if the proportion between the foreground picture and the background picture amounts to 7/2, a contribution from 4 input pixels is needed for each output pixel. This is illustrated in FIG. 6, where dotted lines 11 indicate groups of seven input pixels, each group contributing to one output pixel. However, in these cases always duplication of weight factors occurs, because two or more input pixels fully contribute to an output pixel. The computing means 10 can easily be adapted to deal with this duplication, so that additional storage space in the storage means 9 can be saved.

Figure 7:
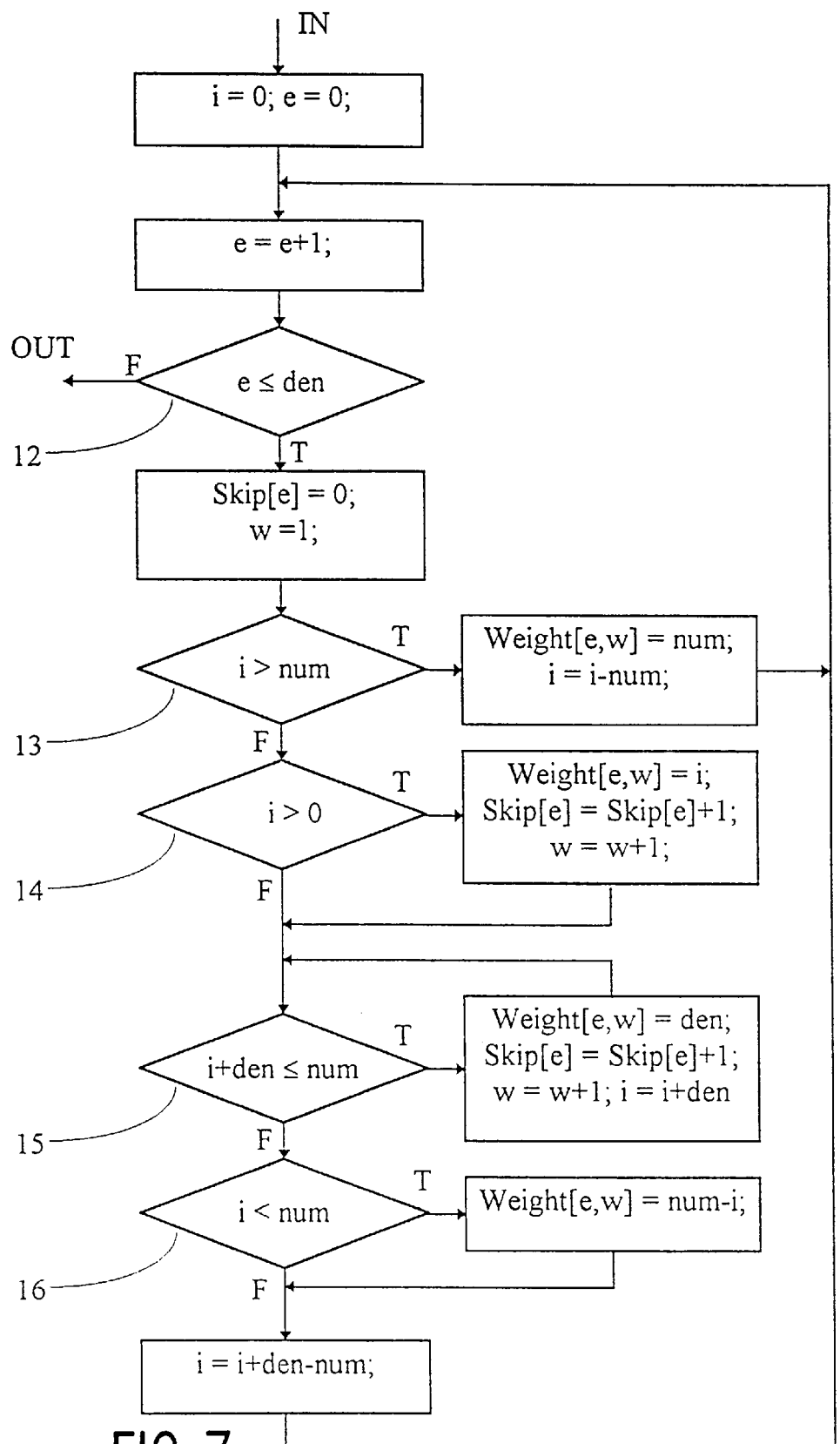
FIG. 7. shows a method for computing the table coefficients.

FIG. 7 shows a method for computing the table coefficients. It assumes that all weight coefficients Weight[e,w] are initially zero, where 'e' denotes the entry number and 'w' denotes the weight number. For each entry 'e', there is a skip coefficient Skip[e]. The symbols 'num' and 'den' denote, respectively, the numerator and the denominator of the fraction, which represents the proportion between the foreground picture and the background picture. The symbol '=' denotes the assignment operation, while the other relational and arithmetic operators have their usual meaning. Rectangles contain a sequence of one or more steps, while diamonds denote a conditional expression. If the expression is true, the path marked with 'T' should be followed, otherwise the path marked with 'F'. A main loop, controlled by a condition 12, comprises the steps for computing one table entry. It is performed a fixed number of times, determined by the denominator. The symbol 'i' is a counter, which simulates the processing of input pixels from the foreground picture. The main loop comprises two different paths, controlled by a condition 13, which can only be true if the denominator is greater than the numerator, i.e., if the resolution of the background picture is higher than the resolution of the foreground picture. In that case, it can happen that an output pixel is completely determined by one pixel from the foreground picture, which means that there is only one weight, equal to the numerator. A condition 14 is true if the first input pixel has already contributed to the previous output pixel, e.g., the input pixel f4 in the second group of FIG. 6. For the remaining part, it contributes to the current output pixel. A condition 15 takes care of input pixels which fully contribute to the current output pixel, e.g. the input pixels f1, f2 and f3 in FIG. 6. A condition 16 deals with pixels which partially contribute to the current output pixel, and partially to the next output pixel, e.g., the input pixel f4 in the first group of FIG. 6.

The table of coefficients stored in the storage means 9 could be implemented in various ways. For example, the table could be organized as a phase table, the entries being ordered according to the phase shift between the background signal and the foreground signal. An additional table could provide the successive phase values and skip values. Finally, some or all table coefficients could be computed by the computing means 10 in real time, saving further storage space in the storage means 9.

In the described embodiment, the target resolution equals the resolution of the background picture. The opposite case has been widely applied in, inter alia, VGA controllers. In that case there is no need to implement scaling and mixing as one operation, as described by the invention. However, the method according to the invention can easily be extended to cope with that case. The first embodiment requires no changes at all. In the second embodiment, the computing means 10 should be adapted in such a way that an opaque pixel of the foreground picture is copied as a whole to an output pixel, while a transparent pixel of the foreground picture is completely replaced by the average of a predetermined number of pixels from the background picture.

Summarizing, the invention provides a method for mixing a foreground picture and a background picture having different resolutions. Parts of the foreground picture of which the color complies with a color-key are designated as being transparent. Artifacts which are caused by scaling a foreground picture containing transparent parts by conventional means are avoided by mixing the foreground picture and the background picture at an intermediate resolution, which substantially equals the least common multiple of the resolution of the foreground picture and the resolution of the background picture. Alternatively, instead of actually scaling the pictures to the intermediate resolution, a phase table can be used, the entries of which prescribe how a background pixel should be combined with a predetermined number of foreground pixels.

What is claimed is:

1. A method for mixing a foreground picture and a background picture, a resolution of the foreground picture differing from a corresponding resolution of the background picture, the method comprising the steps:

designating parts of the foreground picture as being transparent; and replacing transparent parts of the foreground picture by underlying parts of the background picture, the foreground picture and the background picture being converted to a common target resolution, characterized in that the step of replacing transparent parts of the foreground picture by underlying parts of the background picture is effectively accomplished at an intermediate resolution different from the target resolution, said intermediate resolution being substantially equal to the least common multiple of the resolution of the foreground picture and the corresponding resolution of the background picture, and not equal to the resolution of either said foreground picture or said background picture.

2. The method as claimed in claim 1, characterized in that the method further comprises the steps:

determining a fraction which substantially represents the proportion between the resolution of the foreground picture and the resolution of the background picture;

scaling the foreground picture and the background picture to the intermediate resolution by replicating pixels of the foreground picture a number of times equal to a predetermined multiple of the denominator of the fraction, and by replicating pixels of the background picture a number of times equal to the predetermined multiple of the numerator of the fraction;

forming a result picture by replacing, at the intermediate resolution, transparent pixels of the foreground picture by underlying pixels of the background picture; and converting the resolution of the result picture from the intermediate resolution to the target resolution.

3. The method as claimed in claim 2, characterized in that the predetermined multiple is two.

4. The method as claimed in claim 1, characterized in that the method further comprises the steps:

constructing a table having entries each comprising weight factors defining the contribution of a predetermined number of input pixels from the foreground picture to an output pixel of a result picture, the weight factors being computed in a predetermined way to predict the effects of mixing the background picture and the foreground picture at the intermediate resolution; and producing output pixels of the result picture by processing one input pixel from the background picture and the predetermined number of input pixels from the foreground picture, wherein the processing comprising the steps:
(1) replacing transparent pixels from the foreground picture by the pixel from the background picture, the replacement yielding replaced pixels with the same weight factors as the transparent pixels;
(2) averaging the replaced pixels and opaque pixels from the foreground picture in proportion to their respective weight factors; and
(3) skipping one input pixel from the background picture and a number of input pixels from the foreground picture.

5. The method as claimed in claim 4, characterized in that each table entry further comprises a skip factor which defines the number of input pixels from the foreground picture which have to be skipped after production of the output pixel.

6. The method as claimed in claim 4, characterized in that the target resolution is equal to the resolution of the background picture.

7. A display apparatus comprising:

first and second inputs for receiving a foreground picture and a background picture, respectively, a resolution of the foreground picture differing from a corresponding resolution of the background picture, and the foreground picture comprising transparent parts;

scaling means for converting the resolution of the foreground picture and the background picture to a common target resolution; and mixing means for mixing the foreground picture and the background picture by replacing the transparent parts of the foreground picture by underlying parts of the background picture, characterized in that the display apparatus further comprises:

storage means for storing a fraction substantially representing the proportion between the resolution of the foreground picture and the resolution of the background picture; and further scaling means for scaling the foreground picture and the background picture to an intermediate resolution by replicating pixels of the foreground picture a number of times equal to a predetermined multiple of the denominator of the fraction, and by replicating pixels of the background picture a number of times equal to the predetermined multiple of the numerator of the fraction, said intermediate resolution not being equal to either of said foreground picture resolution or said background picture resolution.

8. The display apparatus as claimed in claim 6, characterized in that the predetermined multiple is two.

9. A display apparatus comprising:

first and second inputs for receiving a foreground picture and a background picture, respectively, a resolution of the foreground picture differing from a corresponding resolution of the background picture, and the foreground picture comprising transparent parts;

scaling means for converting the resolution of the foreground picture and the background picture to a common target resolution; and mixing means for mixing the foreground picture and the background picture by replacing the transparent parts of the foreground picture by underlying parts of the background picture, characterized in that the mixing means further comprises:

storage means for storing a table having entries each comprising weight factors defining the contribution of a predetermined number of input pixels from the foreground picture to an output pixel of a result picture, the weight factors being computed in a predetermined way to predict the effects of mixing the background picture and the foreground picture at an intermediate resolution, said intermediate resolution being the least common multiple of said foreground picture resolution and said background picture resolution, and not being equal to either of said foreground picture resolution or said background resolution; and computing means for producing output pixels of the result picture by processing one input pixel from the background picture and the predetermined number of input pixels from the foreground picture, the processing comprising the steps:
(1) replacing transparent pixels from the foreground picture by the pixel from the background picture, the replacement yielding replaced pixels with the same weight factors as the transparent pixels,
(2) averaging the replaced pixels and opaque pixels from the foreground picture in proportion to their respective weight factors, and
(3) skipping one input pixel from the background picture and a number of input pixels from the foreground picture.

10. The display apparatus as claimed in claim 8, characterized in that each table entry further comprises a skip factor for determining the number of input pixels from the foreground picture which have to be skipped after the output pixel has been produced.

* * * * *